(12) United States Patent
Huhnerbein (10) Patent No.: US 7,537,409 B2
(45) Date of Patent: May 26, 2009

(54) LOCKING DEVICE

(75) Inventor: Frank Huhnerbein, Schechen (DE)

(73) Assignee: Steelcase Werndl AG, Rosenheim (DE)

( * ) Notice: Subject to any disclaimer, the term of this patent is extended or adjusted under 35 U.S.C. 154(b) by 60 days.

(21) Appl. No.: 11/664,092

(22) PCT Filed: Oct. 14, 2004

(86) PCT No.: PCT/EP2004/011573

§ 371 (c)(1),
(2), (4) Date: Mar. 29, 2007

(87) PCT Pub. No.: WO2006/042564

PCT Pub. Date: Apr. 27, 2006

(65) Prior Publication Data

US 2008/0072515 A1    Mar. 27, 2008

(51) Int. Cl.
*F16B 21/02* (2006.01)
(52) U.S. Cl. .................. 403/348; 403/350; 411/549; 411/552
(58) Field of Classification Search .......... 403/348, 403/349, 350, 351; 411/549, 552, 553
See application file for complete search history.

(56) References Cited

U.S. PATENT DOCUMENTS

| | | | | |
|---|---|---|---|---|
| 1,229,313 A | * | 6/1917 | Nichols | 403/349 |
| 2,327,327 A | * | 8/1943 | Maynard | 411/550 |
| 2,337,483 A | | 12/1943 | Marty | |
| 2,476,339 A | | 7/1949 | Opel | |
| 2,690,542 A | * | 9/1954 | Pearce et al. | 403/350 |
| 4,903,451 A | | 2/1990 | Gresswell | |
| 6,292,142 B1 | | 9/2001 | Pittman | |
| 6,568,893 B2 | * | 5/2003 | LeVey et al. | 411/349 |

FOREIGN PATENT DOCUMENTS

| | | |
|---|---|---|
| DE | 35 46 396 C2 | 7/1987 |
| DE | 40 00 802 A1 | 7/1991 |
| DE | 295 10 504 U1 | 9/1995 |
| GB | 2 236 141 * | 3/1991 |

OTHER PUBLICATIONS

International Search Report mailed Jun. 17, 2005 (English and German Translations).

* cited by examiner

*Primary Examiner*—Michael P Ferguson
(74) *Attorney, Agent, or Firm*—Nixon & Vanderhye PC (57) ABSTRACT

An improved locking device is essentially characterized by the following features: at least two recessed sections extend radially outwards from the central axis and are arranged at regular angular intervals from one another, a setting member or rotary member is provided in the inside of the pot-like or housing-like fixed element; the rotary member comprises an actuation portion with a locking element which is axially offset in the direction of the base; the locking element has a structure provided with locking arms which project radially outwards, so that the thus designed locking element can be axially inserted through the recess.

17 Claims, 5 Drawing Sheets

LOCKING DEVICE

CROSS-REFERENCES TO RELATED APPLICATIONS

This application is the U.S. national phase of International Application No. PCT/EP2004/011573 filed 14 Oct. 2004 which designated the U.S., the entire contents of which are hereby incorporated by reference.

STATEMENT REGARDING FEDERALLY SPONSORED RESEARCH OR DEVELOPMENT

Not applicable.

FIELD

The technology herein relates to a locking arrangement for fixing two items of furniture to one another.

BACKGROUND AND SUMMARY

Unit-furniture systems in their wide-ranging forms are sufficiently well known. Box-shaped office furniture systems or shelving systems are also very popular. These can be assembled with a high degree of variability for example from individual container-shaped or generally box-shaped basic units, which are sometimes also referred to below as modules. The modules may be left open for example, but may also be provided at their front with a wide range of flaps. Drawer elements may also be incorporated, etc.

Such a shelving system which can be assembled using a modular method of construction is then faced for example with the problem of how to fix the individual modules as simply as possible yet effectively to one another so that a stable overall construction finally results.

An exemplary illustrative non-limiting implementation provides an improved locking system for items of furniture, in particular for box-shaped modular or basic units, in order to fasten or fix such individual parts to one another.

An exemplary illustrative non-limiting implementation provides a highly efficient connecting system with which the individual items of furniture to be connected can be provided at the factory. The basic principle is such that any desired items of furniture, for example box- or container-shaped basic or modular units, provided with corresponding connecting and locking devices can be placed one on top of the other so that it is then merely necessary for example, to actuate the locking or latching device provided on the modular unit placed on top, thereby fixedly connecting the two items of furniture to one another.

The structure is preferably such that not only similar or functionally identical but, in particular, identical locking base sections are provided on each item of furniture, these being positioned in such a way that, given a corresponding structure, the locking elements provided on the two items of furniture in each case come to lie congruently to one another. Where the structure is identical it is then possible, depending on which locking base section is more easily accessible, to use the latter in turn to carry out the locking with the respective other locking section. The locking is preferably performed simply by pressing in and twisting an actuating part.

A bayonet-type locking mechanism is preferably provided. For this purpose, defined projections or depressions are formed on the individual sections and elements which interact with one another in order to produce the desired bayonet-type closure mechanism. Preferably provided locking arms may consist of arms which project radially outwards from a central section of the rotatable locking element. In the case of the basic unit, two diagonally extending locking arms are preferably provided. However, in a preferred development, the locking element is provided with locking arms arranged in a cross shape. This offers the possibility, for example, that the containers to be built one on top of the other can also be mounted on one another in a position in which they have been rotated through 90°, which means that the opening side of a box-shaped container may for example be oriented not only to the front, but also to the left, to the right or to the rear as desired. This does not have a disadvantageous effect on the effectiveness of the locking device.

In a particularly preferred embodiment, the individual locking sections are designed in such a way that they correspond to the shape of a through opening in a cup-shaped bottom section of the respective locking element and, in a basic position, come to lie at the level of this through opening. The entire locking base section is thus incorporated securely against rotation in a furniture part. The furniture part equipped with such a locking element is therefore virtually closed in a continuous outer surface, since the locking arms of a locking element come to lie at the level of the through opening, this opening thereby being virtually covered.

In an exemplary illustrative non-limiting implementation, provision is also made for a spring device which applies force to the adjustable locking or rotating part in its unlocked basic or starting position. This ensures that the locking arms in their basic or starting position come to lie exactly in the plane of the through opening in the cup-shaped bottom of a locking base section. This also has the advantage that during an unlocking operation—when the locking arms are rotated into the release position, in which position they come to lie congruently to the through opening in the cup-shaped bottom section of a locking base—the corresponding locking element is then lifted into its unlocked position by the spring action. In this position, a further clamping mechanism which then retains the rotating part in this axial position is also provided.

BRIEF DESCRIPTION OF THE DRAWINGS

These and other features and advantages will be better and more completely understood by referring to the following detailed description of exemplary non-limiting illustrative implementations in conjunction with the drawings of which.

DETAILED DESCRIPTION

Figure 1:
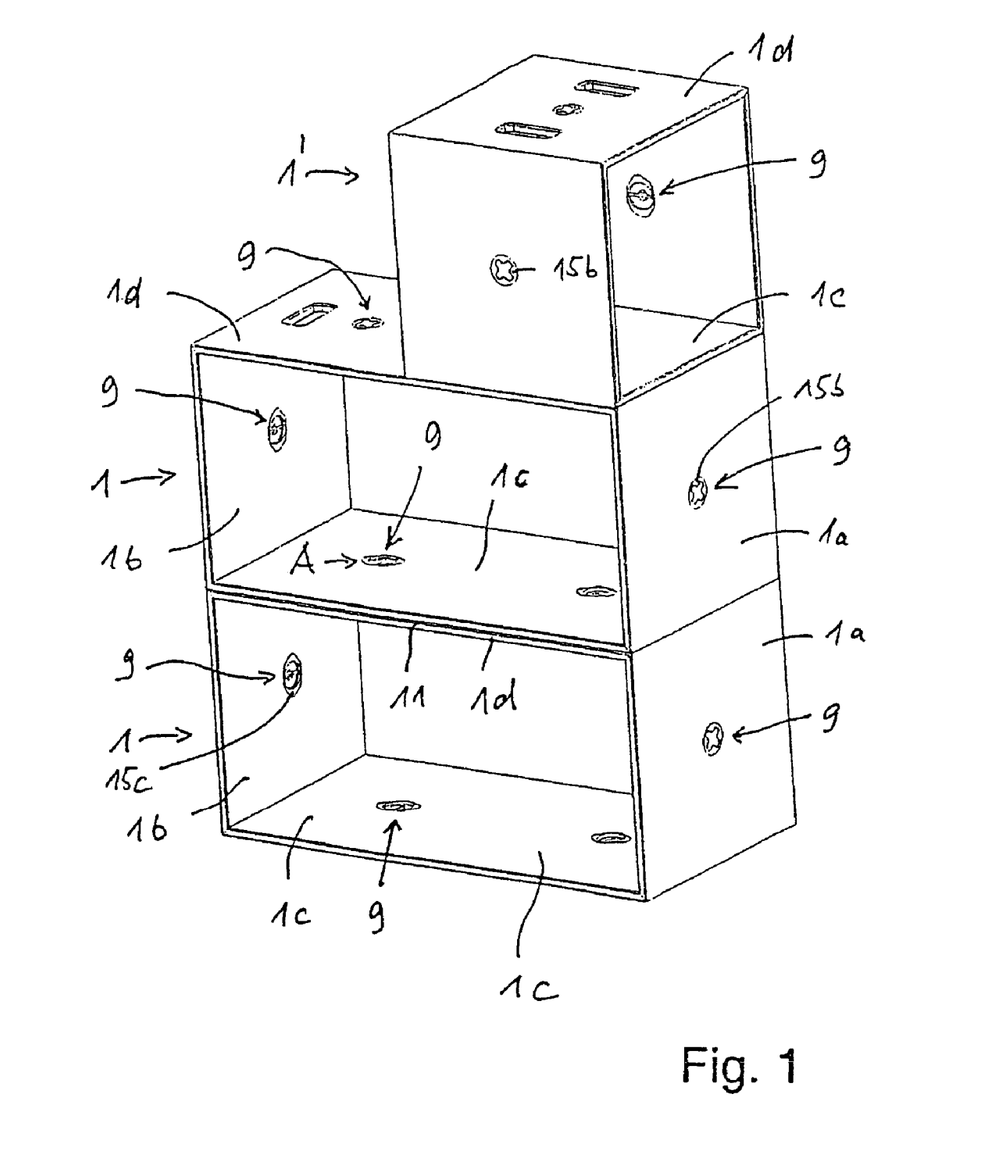
FIG. 1 shows a schematic perspective representation of a furniture system which is composed of a plurality of container elements.

The schematic perspective representation in FIG. 1 shows three box- or container-shaped items of furniture 1 which are built one on top of the other and fixed to one another.

FIG. 1 shows two items of furniture 1 of relatively large dimensions built one on top of the other, the depth and height of which are dimensioned to be identical, so that the corresponding end face is formed square. The length is twice as long as the height or depth. A locking device 9, which will be discussed in more detail below, is incorporated in the center of each of the vertical side walls 1a. The same applies to the opposite vertical side wall 1b. Locking devices 9 are likewise also incorporated in the lower bottom board 1c and the upper top board 1d, and, since the bottom board 1c and the top board 1d are twice as large as the end-forming side walls 1a and 1b, provision is made there in each case for two locking devices 9 which are arranged centrally in the transverse direction of the rectangular bottom and top board and thus have a longitudinal space corresponding to half the length of these board-shaped wall elements, the spacing from the center of one locking device 9 to the end of the rectangular bottom being a quarter of the overall length of the board.

For the purpose simply of illustrating various possible construction variants, FIG. 1 also shows a further container element 1' which is built on and mounted at the top, this element having only half the length of the container elements 1 situated below and having only one centrally arranged locking device 9 in the bottom board 1c and the top board 1d respectively.

This very construction shows that in each case the locking device 9 incorporated in a bottom board 1d comes to lie, when seen from the top, directly adjacent and congruent to a respective locking device 9 which is provided in an underlying top board 1d of an immediately neighbouring box- or container-shaped item of furniture 1.

According to the exemplary embodiment described, all of the stated locking devices 9 are functionally identical and at the same time preferably even identical in design, in which regard two respective locking devices 9 situated in mirror-image form with respect to one another interact and form an exemplary illustrative locking arrangement.

Figure 2:
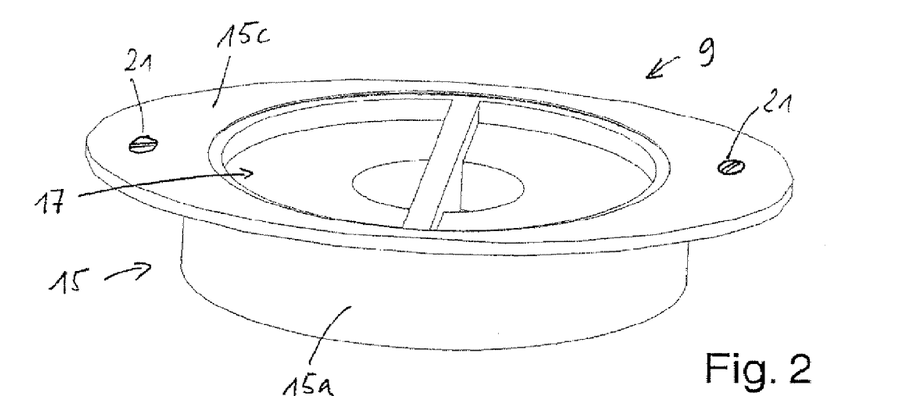
FIG. 2 shows a schematic perspective representation of an exemplary illustrative non-limiting first locking element incorporated in a container bottom.
Figure 3:
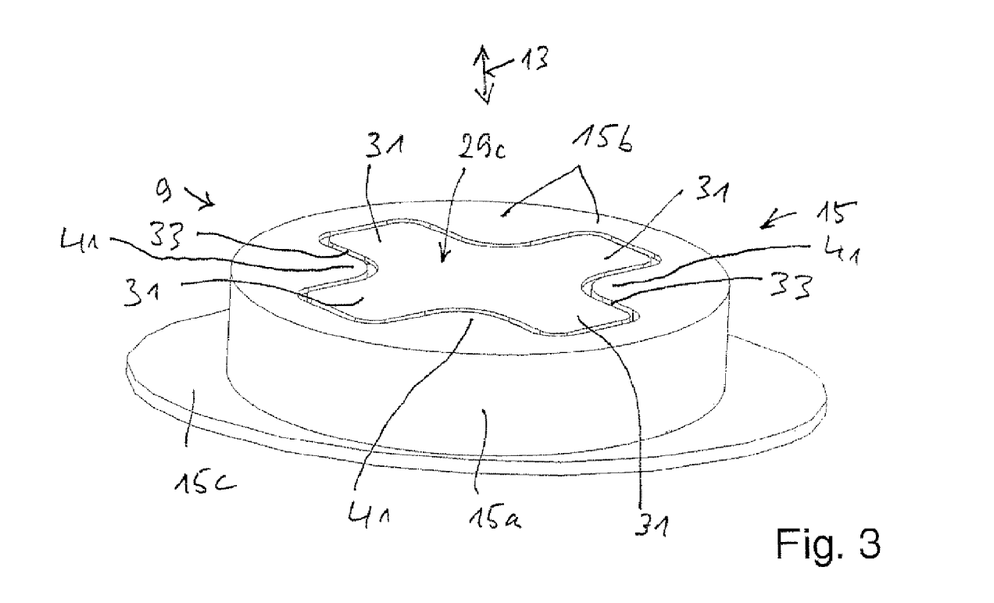
FIG. 3 shows a corresponding perspective representation of a second exemplary illustrative non-limiting identical locking device which is incorporated in a top wall of a container furniture item and interacts in the locked state with the first locking device depicted in FIG. 2.
Figure 4:
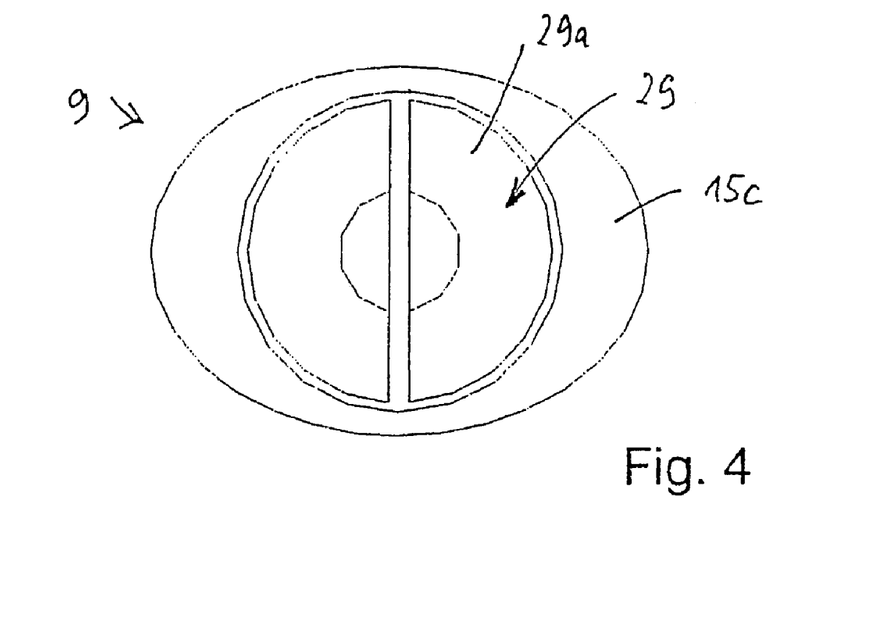
FIG. 4 shows a schematic top view of an exemplary illustrative non-limiting locking device.

Reference will be made in the text below to FIGS. 2 and 3, FIG. 2 being a schematic perspective representation showing a locking device 9 viewed more or less from the upper side and FIG. 3 showing a corresponding locking device 9 viewed more or less from the lower side, specifically illustrating how two locking devices 9 interact, for example at the point indicated by "A" in FIG. 1, in order to fixedly connect an upper bottom board 1c to an underlying top board 1d of two furniture containers 1. As will be further discussed below, when in use not only do the two boards 1c and 1d then lie against one another along a common add-on plane 11, but also the two locking devices according to FIG. 3 and FIG. 4 touch one another with their bottom faces or are positioned with only a small spacing. In other words, the two locking devices 9 shown in FIGS. 3 and 4 are brought into contact or direct contact in the add-on direction indicated by the arrow 13. The stated add-on plane 11 corresponds for example to a horizontal plane. FIGS. 2 and 3 thus already show that the respectively interacting locking devices 9 have a cup-shaped basic structure, that is to say comprise a cup-shaped fixed part, housing part or base part 15 which has a cup-shaped or cylindrical boundary wall 15a and a bottom 15b.

In the exemplary embodiment shown, each locking device 9 additionally comprises a peripheral edge or flange 15c which, in the exemplary embodiment shown, comes to lie at the level of the upper cup opening 17, i.e. opposite the lower bottom 15b.

Each of the locking devices 9 has overall a configuration which deviates from a circular shape in order finally to be able to be incorporated securely against rotation in a shelf board or bottom board. In the exemplary embodiment shown, the cylindrical boundary wall 15a of the cup-shaped locking device 9 is not secure against rotation per se. However, the upper flange-shaped edge 15c is formed elliptically. An elliptical depression, corresponding to the material thickness of this edge, is made in the respective furniture board 1c or 1d in addition to a cylindrical bore 19 which passes right through the board, with the result that it is impossible to rotate the locking device 9 after it has been inserted. Otherwise, for example, one or two screws 21 passing through the flange-shaped edge 15c could also be screwed into the respective board 1c or 1d to prevent rotation even with a circular edge or flange 15c.

Moreover, it will also be possible for the cup-shaped design of the base part or fixed part 15 to have, for example at the outer periphery, a configuration which deviates from a cylindrical cross section so as to ensure a rotationally secure fit through a shelf board in a correspondingly fashioned bore 19. However, this involves more effort.

Figure 5:
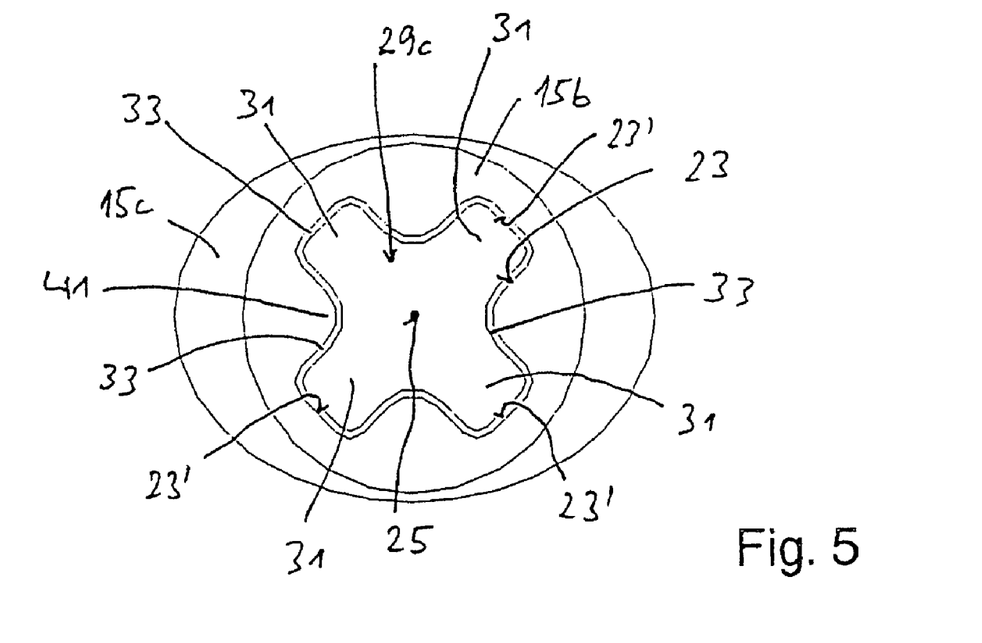
FIG. 5 shows a bottom view of an exemplary illustrative non-limiting locking device.

FIG. 4 shows a schematic axial top view and FIG. 5 shows a schematic axial bottom view of the locking device 9 described. It can be seen from FIG. 5 that the disc-shaped bottom 15b of the locking device 9 has a cross-shaped cutout 23. In the exemplary embodiment shown, this cutout 23 is of symmetrical design starting from a central axis line 25, which means that the arm-shaped opening regions 23' emanating radially from the central axis 25 have the same radial length and the same width extending transversely to the radial direction.

An adjusting member 29, which is also sometimes referred to below as a rotating part 29, is arranged in the cup-shaped interior 27 of each locking device 9, i.e. in the cup-shaped interior 27 of the base part or fixed part 15 of a respective locking device 9. This rotating part 29 comprises a cover cap-shaped actuating part 29a, a driver 29b situated below the latter and axially adjoining the actuating part 29a, and a locking element 29c arranged on the underside of the driver 29b. The aforementioned sections 29a to 29c of the incision member or rotating part 29 thus formed are fixed in terms of rotation relative to one another. In addition, the rotation part 29 thus formed may be formed in one piece. However, it is also possible for the driver 29b to be able to be retracted and extended axially, i.e. telescopically, to a small extent; in other words, the axial length of the driver is adjustable.

In the exemplary embodiment shown, the locking element 29c comprises four locking arms 31 emanating from the central axis 25, these arms likewise again being cross-shaped in their configuration and their arrangement, i.e. corresponding in this respect to the cross-shaped cutout 23. However, the width and length of these locking arms 31 are designed in such a way that their dimensions are correspondingly smaller, with the result that, even in the basic position according to FIG. 3 or 5, these locking arms 31 are surrounded by a peripheral gap 33 even if they are arranged at the level of the bottom 15b in the cutout 23 situated in the bottom. An overall clearance is thereby achieved, which will be further discussed below.

Figure 6:
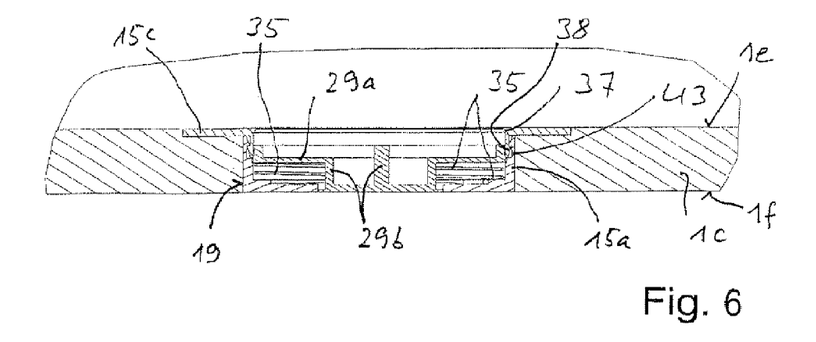
FIG. 6 shows a schematic cross-sectional representation through a locking device.

As can be seen from the cross-sectional representations according to FIG. 6 et seq., there is additionally provided in the interior 34 a spring device 35 which is supported on the one hand on the cup-shaped housing, i.e. on the bottom 15b of the base part or fixed part 15, and on the other hand on the underside of the cover cap-shaped actuating part 29a. Since the rotating part 29 is held captively in the cup-shaped housing part (also sometimes referred to below as fixed part 5), the rotating part 29 cannot be pushed out or fall out of the cup-shaped receiving space 34. For this purpose, at least two projections, preferably a plurality of projections, which are situated offset from one another in the circumferential direction, or a peripheral closed abutment edge 37 against which the cover cap-shaped actuating part 29a would butt, are formed at the level of the flange-shaped edge 15c. The axial longitudinal extent of the rotatable adjusting member or rotating part 29 is in this case such that, in the basic position according to FIG. 6, the arm-shaped and radially projecting locking arms 31 come to lie exactly at the level of the cross-shaped cutout 23 in the bottom 15b. The spring device 35 mentioned is in this case coordinated in such a way that the prestressing force of the spring exerts adjustment forces on the rotating part 29 in the direction of the upper flange-shaped edge 15c, but only until the cover cap-shaped actuating part 29 reaches the basic position shown in FIG. 6. In this basic position there still remains per se a further axial adjustment travel until the cover cap-shaped actuating part 29a abuts against the upper edge 37. However, in the position shown in FIG. 6, the one or more projections 38 (indicated in FIG. 9) formed on the peripheral edge of the cover cap-shaped actuating part 29a interacts with the depressions made at corresponding points in the inner wall of the cup-shaped central section of the fixed part 15. This also results in a pre-adjustment and alignment of the cross-shaped locking arms 31, since it is precisely in that position that the locking arms 31 can be brought into the same cross-shaped alignment as the cross-shaped cutout 23. The projections 38 engaging in the depression 43 in the peripheral wall 15a of the fixed part 15 in this case additionally produce a certain frictional locking. This also ensures that the spring force of the spring device 35 per se cannot cause the insert part or rotating part 29 to be further adjusted by the force of the spring alone, as is shown in FIG. 6.

The above-described construction also results in the fact that when correspondingly shaped containers are supplied, the cover cap-shaped cover 29 is situated virtually with a small spacing below the level surface of the outer boundary plane 1e of a corresponding wall of the box-shaped container, and also the opposite level surface 1f is closed virtually over the whole surface by the bottom and the locking element 29c seated in the cutout 23 in the bottom 15b.

Figure 7:
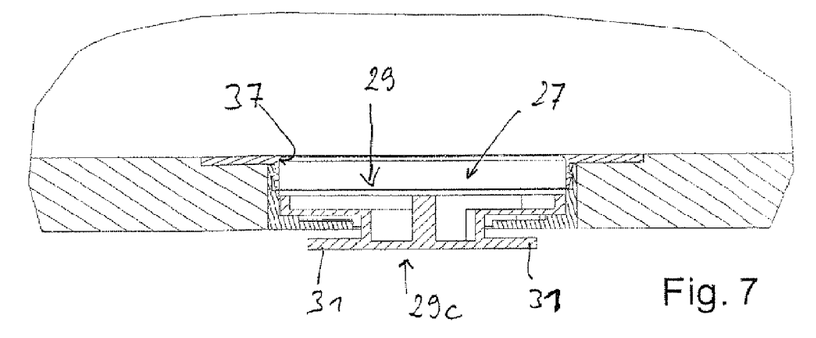
FIG. 7 shows a cross-sectional representation corresponding to FIG. 6 but in which the cross section runs diagonally through a cross-shaped locking element.

FIG. 7 corresponds substantially to the representation according to FIG. 6, but with the difference that in FIG. 7 the rotating part or adjusting member 29 is pressed against the force of the spring energy store device 35 in the direction of the bottom 15b, with the result that the locking element 29c with the mutually opposite locking arms 31 is pressed downward beyond the surface of the bottom 15b into that position in which the actual locking is then carried out. Since the sectional representation according to FIG. 6 and FIG. 7 is represented diagonally through the cross-shaped locking element 29c, the overall length of the locking elements 31 can only be seen in FIG. 7, not in FIG. 6.

Figure 8:
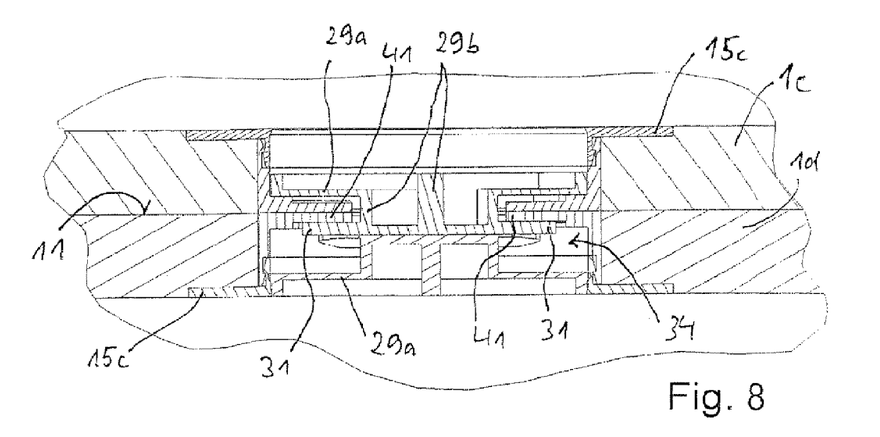
FIG. 8 shows a corresponding cross-sectional representation to FIG. 7, but in the locking position, in which two locking devices situated in mirror-image form with respect to one another, and thus two bottoms of two items of furniture, are fixed to one another.

If two containers are placed one on top of the other in the correct position corresponding to FIG. 1 and are to be fixed to one another, two locking devices 9 described come to lie directly congruent to one another corresponding to the representation according to FIG. 8. Here, the two locking devices 9 which come to lie adjacently are oriented in mirror-image form with respect to their central add-on plane 11, i.e. with their two bottoms lying on one another. The side on which the bottoms come to lie in each case represents the respective outer side of a corresponding container, with the result that the cover cap-shaped actuating part 29a is in each case freely accessible from the inner side of a container.

In order to carry out locking of two items of furniture, the freely accessible cover cap-shaped actuating part 29 in one of the two locking devices 9, for example in the upper locking device 9 in FIG. 8, is pressed in against the force of the spring energy store 35. Since the two cross-shaped locking elements 29c of the upper and lower locking devices 9 are situated one on top of the other, pressing in the upper rotating part 29 thus causes the lower locking element 29c to be displaced axially downwards, or the locking elements 29c belonging to the lower locking device 9 are adjusted by the telescopically retractable and extendable driver unit 29a (if such a mechanism is provided) in such a way that the locking element 29c connected fixedly in terms of rotation to the upper actuating part 29a has its four radially projecting locking arms or fingers 31 situated in the interior 34 of the fixed part 15 situated in the other shelf board, i.e. in the lower shelf board, specifically directly adjacent to the cup-shaped bottom 15c of the lower second locking device 9 in FIG. 8. If the actuating part 29a belonging to the upper locking device 9 is subsequently rotated axially, the locking arms 31 belonging to the upper rotating part 29 are situated behind the remaining locking projections 41, which are formed by the remaining bottom sections in the bottom 15b of the lower locking device 9 in FIG. 8. These locking projections 41 are the remaining material sections in the bottom 15b which are in each case formed in the direction of rotation about the central axis 25 with a rotational offset with respect to the cross-shaped cutouts 23.

Since, as mentioned, the cutout 23 is designed to be larger in dimension than the locking elements 29c which can be moved through it, and also, in the rotating or locking position otherwise, the ends of the locking elements 29b terminate with a radial spacing in front of the boundary wall 15a of the base part or fixed part 15 interacting therewith, a sufficient compensation margin is ensured in order for example to compensate for tolerance errors when fixedly connecting two containers one on top of the other.

It is also preferred for the underside of these locking projections 41 of the bottom 15b and/or the adjacent bearing surface of the locking arms 31 to be roof-shaped in cross section, so that with increasing rotating movement from the neutral starting position, an increasingly greater clamping action is produced between the adjusting member 29 of one locking device 9 and the corresponding locking projections 41 in the bottom 15b of the respective second locking device 9 interacting therewith.

Figure 9:
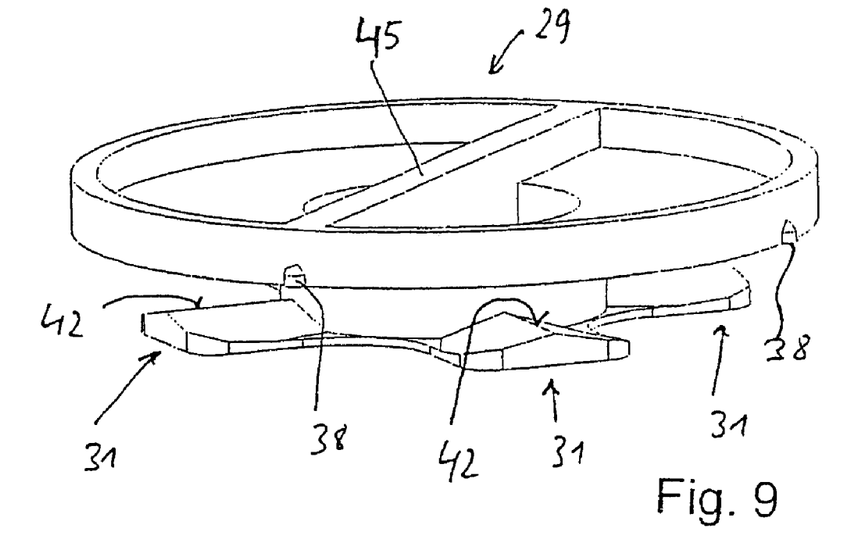
FIG. 9 shows a schematic perspective representation of an exemplary illustrative non-limiting rotating part having locking arms which are slightly roof-shaped in cross section.
Figure 10:
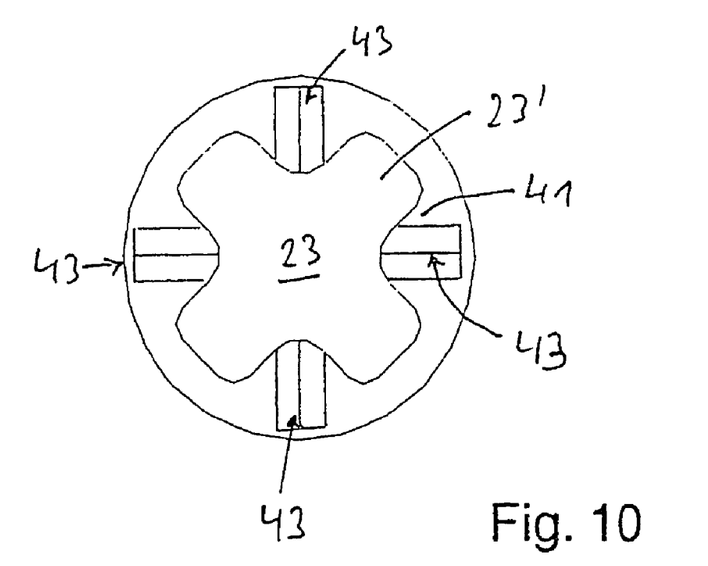
FIG. 10 shows a schematic top view of an empty cup- or housing-shaped fixed part having locking depressions in the remaining locking projections so as to achieve a bayonet-type locking mechanism.

FIG. 9 shows the locking arms 31 which are slightly roof-shaped in cross section or provided with a preferably central, radially extending, slightly rib-shaped elevation 42, and FIG. 10 shows a top view of the empty cup-shaped housing or fixed part 15 without inserted adjusting member or rotating part 29, with the result that the corresponding slightly groove-shaped depression 43 can be discerned particularly clearly here. This affords a bayonet-type locking mechanism, specifically if, in the final locking position, the for example slightly rib-shaped or gable-shaped elevations or projections 42 on a respective locking arm 31 then engage thus in the corresponding depressions 43 on the inner side of the bottom 15b of the cup-shaped housing cover 9a of the respective second locking device. Since the rotating part is provided with a gripping rib 45 or a gripping projection 45 which assists the rotary movement, it is also possible to tell directly from the orientation of this gripping projection 45 whether a locking engagement has taken place or not.

Finally, vertical depressions or vertical projections can also be formed on the inner side of the peripheral wall 15a of the cup-shaped housing part 9a, and these interact with corresponding vertical projections or vertical depressions on the outer periphery of the cover cap-shaped rotating part 29 and thereby also assist the bayonet-type closure mechanism. This also makes it possible for the person carrying out the locking to feel directly when the adjusting member 29 has reached the final locking position.

The exemplary embodiment has been described for that case in which the cutout 23 in the bottom 15c is cross-shaped and the locking arms 31 are also correspondingly cross-shaped. However, it would also be conceivable in principle for the cutouts as well as the locking arms to have only a diagonal shape or bar shape.

It is also possible for the spiral spring device 35 described to be replaced by elastically deformable internal plastic arms cast integrally with the cup-shaped housing part 15, which is preferably formed from plastic, these plastic arms exerting the desired prestressing forces on the adjusting member 29.

An unlocking operation can again be carried out just as simply as the locking operation. Precisely that rotating part 29 which has been used for the locking operation is now once more turned back or rotated further until the locking arms 31 come to lie in the correct position with respect to the cross-shaped through opening 23 in the two bottoms 15b situated one on top of the other. The assistance provided by the spring energy store then moves the pressed-in rotating part back again into its raised position in FIG. 6.

The roof-shaped run-on surfaces on the locking arms 31 or otherwise obliquely formed or wedge-shaped run-on surfaces make it possible, with increasing rotating movement, to produce increasingly greater clamping forces directed axially towards one another between the two interacting locking devices 9. Each of the two locking devices 9 is in this case firmly anchored on the associated item of furniture, for example on a bottom board 1c and a top board 1c situated below the latter. Since the flange-shaped peripheral edge 15c in each case comes to lie on the opposite inner side of the container, none of the two locking devices can be removed from its bore in the associated shelf board even when locking forces are to be directed towards one another with ever increasing intensity. Each of the two locking devices 9 is in this case held on the associated shelf board by the flange-shaped edge.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

The invention claimed is:

1. Locking arrangement for fixing two items of furniture to one another, by connecting two side walls in each of which a locking device can be fitted, the locking arrangement comprising two locking devices, the two locking devices being designed to be structurally and functionally identical, each locking device having a cup-shaped fixed part, a cutout being formed in an associated enclosed bottom of the cup-shaped fixed part which is perpendicular to a central axis which passes axially through the fixed part, the cutout comprising cutout sections extending radially outwards from the central axis, at least two radially outwardly extending cutout sections being arranged at regular angular sections to one another emanate from the central axis of the fixed part, and a rotating part acting as an adjusting member being provided in the interior of the cup-shaped fixed part, the rotating part comprising an actuating part having a locking element situated axially offset in the direction of the bottom of the fixed part, the locking element having a configuration comprising a plurality of radially outwardly projecting locking arms so that the locking element thus formed can be guided axially through the cutout, and in order to effect locking, two locking devices facing one another by way of their bottom region can be fixed to one another by pressing in the adjusting member or rotating part of one locking device against a biasing force, axially inward towards the bottom of the fixed part of the one locking device, so that the associated locking element can be guided through the cutout in the bottom of its own locking device and through the corresponding cutout in the bottom of the adjacent, other locking device and, by a subsequent twisting movement, can be latched behind locking projections formed between the cutout sections and belonging to the bottom of the other locking device to lock together the bottoms of the fixed parts of the two locking devices.

2. Locking arrangement according to claim 1, wherein the locking element and the associated cutout in the bottom of a locking device is shaped and dimensioned so that the corresponding cutout is made larger by the size of a gap which extends around the locking element.

3. Locking arrangement according to claim 1, wherein the cutout in the bottom of the fixed part is cross-shaped.

4. Locking arrangement according to claim 3, wherein the locking element is cross-shaped.

5. Locking arrangement according to claim 1, wherein the locking action is formed in the manner of a bayonet fastening.

6. Locking arrangement according to claim 5, wherein the inner side of the fixed part is provided with respective depressions or projections which, in order to achieve a bayonet-type locking action, interact, at least in a locking position, with a corresponding projection or a corresponding depression on the locking arms and/or on a cover cap-shaped actuating part of the rotating part.

7. Locking arrangement according to claim 1, wherein the locking arms are at least slightly roof-shaped in cross section parallel to the central axis of the fixed part and/or are provided with a projection or an elevation.

8. Locking arrangement according to claim 1, wherein the rotating part has a cover cap-shaped actuating part.

9. Locking arrangement according to claim 8, wherein at least one projection is provided on the peripheral edge of the cover cap-shaped actuating part and a corresponding depression is provided on a cylindrical inner side of a surrounding wall of the cup-shaped fixed part, or vice versa, the projection engaging in the depression in a locking position and/or in a release position.

10. Locking arrangement according to claim 1, further comprising a spring device provided in the interior of the cup-shaped fixed part, the spring device applying pressure to the adjusting member or rotating part so as to move it away from the associated bottom of the fixed part.

11. Locking arrangement according to claim 1, wherein the adjusting member or rotating part is held captively in the interior of the cup-shaped fixed part.

12. Locking arrangement according to claim 1, wherein each locking device is anchored securely against rotation in an associated wall of a box- or container-shaped furniture part.

13. Locking arrangement according to claim 12, wherein overall the locking device deviates from a circular shape.

14. Locking arrangement according to claim 1, wherein the cup-shaped fixed part is provided, on the side situated opposite the associated bottom of the fixed part, with a peripheral, flange-shaped edge.

15. Locking arrangement according to claim 14, wherein the flange-shaped edge deviates from a circular shape.

16. Locking arrangement according to claim 14, wherein the flange-shaped edge is oval-shaped.

17. A method for fixing plural furniture items to one another by mating facing locking devices disposed in or on side walls of said furniture items, said locking devices being designed to be substantially structurally and functionally identical to one another, each said locking device having a cup-shaped fixed part and a cutout formed in an associated enclosed bottom of the cup-shaped fixed part which is perpendicular to a central axis which passes axially through the fixed part, the cutout comprising cutout sections extending radially outwards from the central axis, at least two radially outwardly extending cutout sections being arranged at regular angular sections to one another to emanate from the central axis of the fixed part, said method comprising:

adjusting a rotating part provided in the interior of the cup-shaped fixed part by actuating an actuating part having a locking element situated axially offset in the direction of the bottom of the fixed part, the locking element having a configuration comprising a plurality of radially outwardly projecting locking arms so that the locking element thus formed can be guided axially through the cutout,     axially guiding the radially outwardly projecting locking arms of the locking element through the cutout, and     effecting locking by fixing two locking devices to one another by way of bottom regions thereof by pressing in the adjusting member or rotating part of one locking device against a biasing force, axially inward towards the bottom of the fixed part of the one locking device, to thereby guide the associated locking element through the cutout in the bottom of the locking device associated with the locking element and through the corresponding cutout in the bottom of the adjacent, other locking device and, effecting a subsequent twisting movement to latch behind locking projections formed between the cutout sections and belonging to the bottom of the other locking device to lock together the bottoms of the fixed parts of the two locking devices.

\* \* \* \* \*